United States Patent [19]

Paull et al.

[11] 4,110,628
[45] Aug. 29, 1978

[54] SOLAR SEA POWER SYSTEM

[75] Inventors: Peter L. Paull, Weston, Conn.; Henry W. Archer, New York, N.Y.

[73] Assignee: Texaco Development Corporation, New York, N.Y.

[21] Appl. No.: 733,838

[22] Filed: Oct. 19, 1976

[51] Int. Cl.² .............................................. H02P 9/04
[52] U.S. Cl. ................................... 290/1 R; 60/641; 166/335; 114/264
[58] Field of Search ................. 60/641, 651, 671, 398; 166/0.5; 290/1

[56] References Cited

U.S. PATENT DOCUMENTS

| Re. 27,308 | 3/1972 | Leonard | 166/0.5 |
|---|---|---|---|
| 338,028 | 3/1886 | Bower | 60/398 |
| 3,154,928 | 11/1964 | Harmens | 60/641 |
| 3,517,110 | 6/1970 | Morgan | 166/0.5 |
| 4,033,135 | 7/1977 | Mandrin | 60/648 |

*Primary Examiner*—Robert K. Schaefer
*Assistant Examiner*—John W. Redman

*Attorney, Agent, or Firm*—Thomas H. Whaley; Carl G. Ries; Henry W. Archer

[57] ABSTRACT

Described is an ocean thermal energy conversion system wherein floating, submerged and fixed drilling platforms installed offshore primarily for exploration and/or production of hydrocarbons serve also as working and supportive bases for means for producing electricity by the adiabatic expansion of hydrocarbon gases which are thereby cooled. The cooled gases are then heated by contact with the solar heated surface layers of water and thermally expand thereby actuating a turbine and an electricity producing generator. Pipelines usually installed for the transmission of gases and crude oil to the shore are used dually by running electric cables with them to bring the electricity produced by the system to on-shore consuming or storage facilities. The system also includes means for increasing the surface water temperature such as insulated pipes bringing heat-containing effluent streams from on-shore treating plants.

10 Claims, 2 Drawing Figures

SOLAR SEA POWER SYSTEM

BACKGROUND OF THE INVENTION

1. Field of the Invention

The subject of this invention is a system for converting the solar energy contained in the surface layers of bodies of water and the kinetic energy of natural gases into electricity using already existing oil drilling platforms as supportive and working bases. The system uses as its working fluid the light hydrocarbon gases extracted by the drilling equipment. These gases are cooled by adiabatic expansion as it does electricity-producing work and reheated by solar energy contained in the surface waters to do more. Electricity produced by the system is transmitted to shore by electric cables supported by pipelines conventionally installed to convey gases and crude oil. Accordingly, the system of the invention affords major capital expenditure savings as compared with the costs of building facilities installed specifically for solar energy recovery.

2. Description of the Prior Art

The prior art to which this invention relates is aware, inter alia, of the early research of D'Arsonval, Georges Claude and of other engineering systems for the low cost production of electricity by the work potential created by the temperature differential between warm and cold layers of water, as set forth in U.S. Pat. Nos: 2,006,985; 2,595,164; 3,321,054 and 3,805,515 to list but a few. If one realizes that about $3600 \times 10^{18}$ BTU's of energy per year in the form of sunlight reach the earth and about 45 percent of that energy goes to heat the surface layers of the oceans, the potential in this resource becomes obvious. However, the various proposals made in the prior art have not produced ocean thermal energy conversion systems capable of providing electricity at a cost per kilowatt lower than even the presently expensive fossil fuel systems. One main reason for this failure of the solar energy recovery systems to compete with the fossil fuel systems is the high capital expenditure required in building such systems. This expenditure is considerably reduced by the system of the present invention which is built-in or retrofitted on drilling platforms.

As a background to the invention, it should be noted that in the composition of high pressure natural gas drawn from the earth by way of a well or similar tapping means, a mixture of several gases is usually included. The well effluent is normally choked to a reduced pressure and heated to prevent hydrate formation as a result of reduced temperature due to pressure reduction. Thereafter the gas stream is directed through a phase separator, with the gaseous phase carried by way of a pipe line to a storage area, refinery, or other point of utilization.

Such well head effluent as a rule comprises a relatively large methane portion together with fractions of various heavier hydrocarbon gases, as well as water vapor. Normally, the separated gas stream is maintained in the vapor phase due to the high effluent temperature. However, as the gaseous stream is conducted to the point of delivery, a proportion of the effluent, particularly water vapor and higher hydrocarbon fractions will condense in the transmission lines, pumps, valves and other ancillary equipment.

Such condensate is detrimental and must be accounted for, usually by removal, to assure sufficient passage of the gaseous stream. Further, the well head effluent, although comprising essentially methane, always embodies a proportion of light hydrocarbon condensible constituents.

Natural gas mixtures as withdrawn from the earth, vary in composition from one geographical location to another. However, a representative gas mixture include primarily around 60% of methane ($CH_4$), with amounts of nitrogen and higher paraffins such as ethane ($C_2H_6$), propane, butane and heaving including some portion of very high boiling point material normally termed "condensate" ($C_{10}$ and heavier). All of these compositions, together with water vapor are found in natural gas in varying amounts.

SUMMARY OF THE INVENTION

The system of the invention comprises a separation unit where gas effluent from the well head is separated from liquid hydrocarbons, an expansion unit where the gas is cooled by adiabatic expansion at it does energy-producing work and a solar unit where the cooled gas is heated by the solar heated surface layer of waters thereby thermally expanding to drive a turbine and produce electricity.

Disclosure

Figure 1:
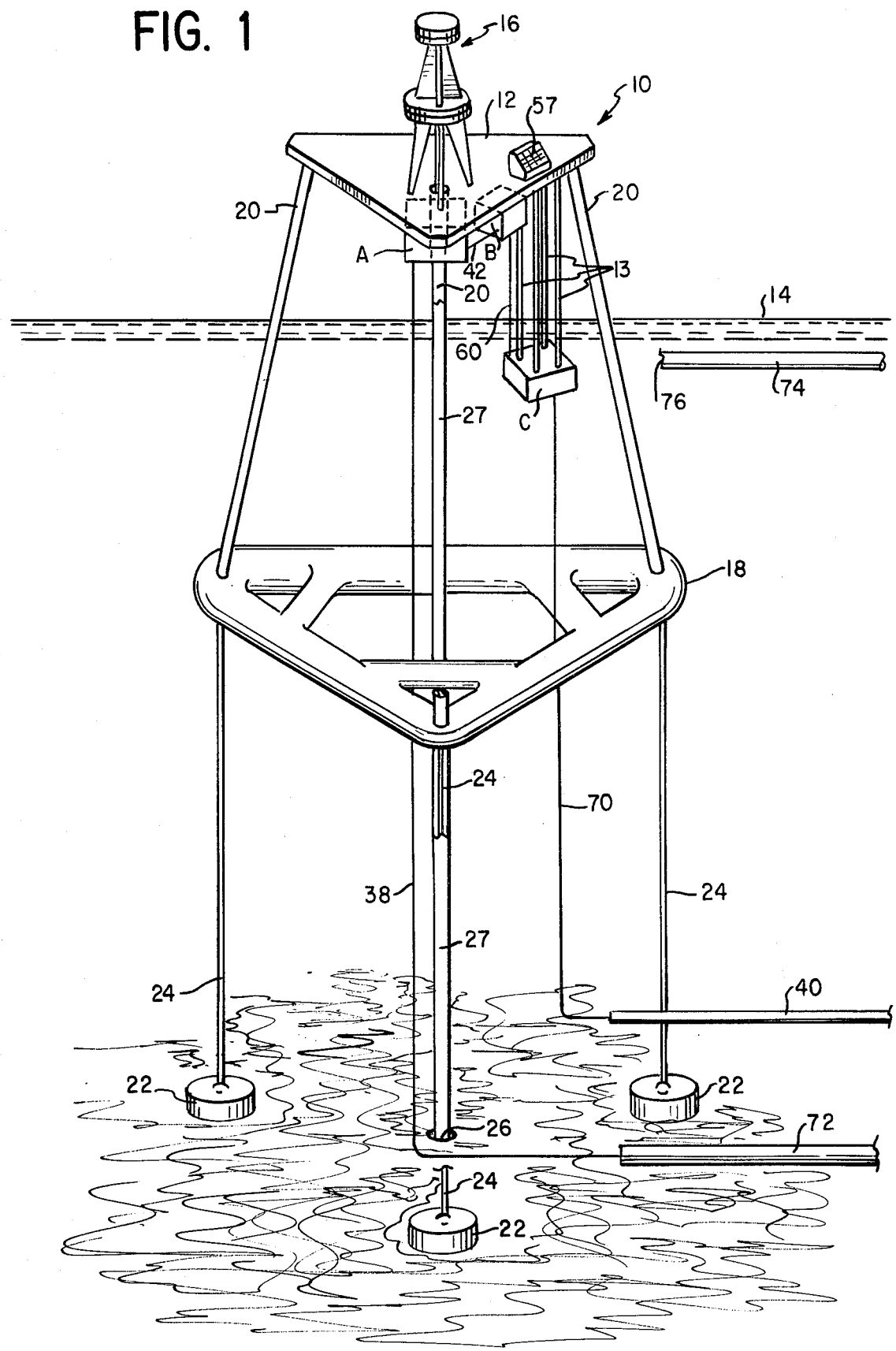
FIG. 1 is a perspective view of an installation embodying the present invention and FIG. 2 is a flow diagram of the units comprising the installation.

Referring to FIG. 1, the installation 10 comprises a separation unit designated item A and connected to an expansion unit B itself operatively associated with solar unit C. These units are secured by suitable fastening means (such as rods 13 in the case of Unit C) to a working platform 12 supported at a suitable height above a water surface 14. This platform supports conventional equipment for drilling and other well operations, a drilling rig 16 being illustrated schematically. In the embodiment shown, platform 12 is supported on a buoyant member 18 by a plurality of support columns 20. Buoyant member 18 is maintained submerged at a preselected site in the water by a plurality of anchors 22 and tension cables 24 extending between and connecting buoyant member 18 and anchors 22. It should be noted, however, that the present invention can also be used in conjunction with floating and fixed drilling platforms.

Following commercial practice, the well is usually drilled undersea at a desired depth thereby to reach one or more pockets of hydrocarbons. The issuing gas stream comprising a gas mixture, liquid hydrocarbon condensate, water vapor and some solids, is then controllably metered from the well under a pressure which varies in accordance with conditions within the pockets. The well head is thereafter completed and provided with flow regulating means such as safety valves and the like which function to choke the initial stream to a working flow rate and pressure. Since the high pressure stream in the invention is connected to equipment whereby a maximum of the well's energy is utilized, choking at the well head will be minimized.

As shown, installation 10 is positioned over well head 26 from which liquid and gaseous hydrocarbons are brought up by the drilling equipment 16.

Figure 2:
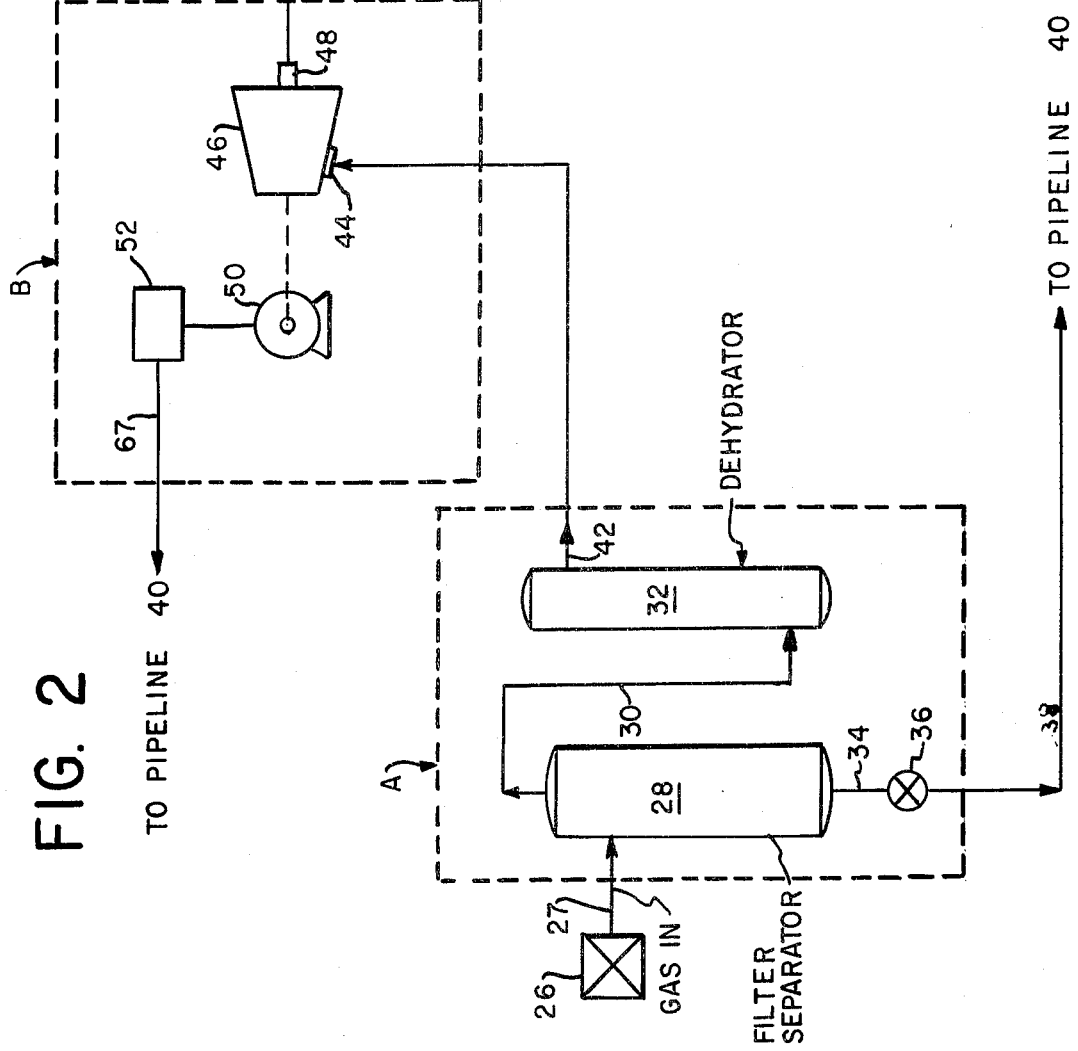

For the purpose of the following description, the well head effluent will be presumed to be at a pressure of between 2500 and 3000 psi upon leaving well head 26. The effluent stream is passed through the pressure and flow regulating equipment previously noted prior to entering conduit 27. The latter communicates with a filter separator 28 in unit A (FIG. 2) which receives one or more streams of pressure gas effluent from one or more sources. While presently shown as a single line, it is appreciated that conduit 27 can represent a plurality of controlled feeder lines communicating several wells dispersed throughout a submerged field, with a single gas treating installation.

Separator 28 initially forms the effluent into a first gas stream containing primarily methane and considerable proportions of liquefiable fractions. This stream is introduced to line 30 for passage to dehydrator 32. A second, or condensate stream is carried from the lower, liquid-accumulating section of separator 28, by line 34 for passage through level control valve 36, thence line 38 to pipeline 40. Valve 36 comprises preferably an automatically regulatable control member or similar equipment adapted to control the liquid flowout from separator 28.

The first mentioned vaporous stream in line 30 at approximately well head pressure, or slightly reduced therefrom, is introduced to dehydrator 32 to remove the major portion of the water vapor content from the stream. Thereafter the relatively dry, high pressure gas, is passed by way of line 42 to the inlet 44 of expander turbine 46 in unit B.

In expander 46, the high pressure dry gas is passed through a series of constricting nozzles to form one or more high velocity gas stream. The latter is in turn impinged against rotatable turbine vanes thereby to drive the turbine's main shaft. The reduced pressure gas stream downstream of the turbine vanes may be again deflected to impinge on second and third stage turbine wheels whereby to sequentially further reduce the velocity of the gas in each successive stage. The expander discharge 48 will then conduct away a low pressure stream of expanded, semi-adiabatically cooled gas. The initial potential energy of the high pressure dry gas stream at the expander inlet is thereby converted into a usable energy source through adiabatic expansion. This energy can in turn be utilized to drive a one or more generators 50 for producing electricity taken off at bus bar 52.

In Unit C, the cooled gas then pass through line 60 to heat exchanger 54 where they are heated by warm surface water pumped in by intake pump 56 through line 58 and flowing out through outlet line 59. Advantageously, pump 56 will be an electric pump powered by current produced by the installation or by fuel cells or solar cells 57. In certain locations such as off Puerto Rico and in the Gulf of Mexico, the surface water temperature will be around 80° F. so that the gases will be heated to around that temperature as they emerge from heat exchanger 54 through pipe 62 and contact turbine 64 thereby operating generator 66 and producing electricity taken off at bus bar 68. The gases then pass out through conduit 70 to pipeline 72 conventionally encased in concrete and leading to on-shore storage or use facilities. An important feature of the invention consists in using the pipeline installation dually by positioning electric cables 67 and 69 running from bus bars 52 and 68 to shore facilities inside the pipelines 40 and 72 or securing the cable to the outside of the pipelines.

Exemplary of the process, as presently disclosed, a multicomponent gas stream is provided at well head pressure of about 2500 psi. The component of said gas comprise primarily methane as the main lower boiling component as well as ethane and propane together with heavier hydrocarbons and water vapor components. Subsequent to work expansion in turbine 46, a cooled stream of gas at 625 psi and −15° to −20° F leaves the turbine low pressure discharge end 48. This exhaust gas stream is then heated by the solar heated water forced through heat exchanger 54 by pump 56 where it will attain the temperature of the water. The greater the difference between the temperature of the gas issuing from turbine discharge end 48 and the water the faster the gas flow and the greater the electrical energy output produced by turbine 64 and the generator 66 operatively associated therewith. After actuating the turbine the gases pass out of the installation through conduit 70 and can be used or treated conventionally. Where convenient, the present invention also contemplates flowing waste effluent water to the present installation in order to further increase the temperature of the water. This can be done by providing an insulated conduit 74 connected to the source of the waste effluent and having its outlet 76 near pump 56 or connected thereto.

It will be evident that many modifications of the present invention will become apparent to those skilled in the art once the concept thereof is understood. Thus instead of using natural gas as the working fluid to drive turbine 64, such gases, which normally contain methane, ethane, propane, butane and pentane, can be fractionated and/or blended in appropriate ratios to obtain a working fluid meeting the vapor/liquid properties most economical for each individual power recovery plant.

It will also be evident when an off-shore well equipped with the present installation stops producing to convert to another working fluid. Such conversion will entail, for example, replacing heat exchanger 54 by an evaporator and a condenser for evaporating and condensing, respectively, a working fluid such as ammonia or "Freon" which will be heated by the hotter surface water and cooled by cooler deep water.

What is claimed is:

1. A solar sea power system comprising, a platform installed offshore over an undersea well hole for exploration and/or production of gaseous and liquid hydrocarbons; means on said platform for extracting gaseous and liquid hydrocarbons from said well hole; gas-liquid separating means for separating said gaseous hydrocarbons from said liquid hydrocarbons; first turbine means communicating with said separating means and actuated by the semi-adiabatic expansion of said gaseous hydrocarbons which are thereby cooled; first electricity-producing generating means driven by said first turbine; a heat exchanger receiving said cooled gaseous hydrocarbons; pump means for bringing solar heated surface water to said heat exchanger to heat said gaseous hydrocarbons; second turbine means actuated by the thus heated gaseous hydrocarbons and second electricity-producing generating means driven by said second turbine means.

2. The system of claim 1, further including a pipelines on the sea floor for bringing liquid and gaseous hydrocarbons to an on-shore installation; and cable means connected to said electricity generating means and extending along said pipeline for transmitting electricity produced thereby to a storage or consuming site.

3. The system of claim 2, wherein said pipelines and said cable means are encased in concrete.

4. The system of claim 1, wherein said platform is supported by a buoyant member.

5. The system of claim 1, further including conduit means having an outlet located near said pump means for flowing thereto hot waste effluent from a source thereto to thereby further increase the temperature of said surface water.

6. The system of claim 1, further including fuel cells for connected to and powering said pump means.

7. The system of claim 1, wherein said pump means are powered by current produced by said generating means.

8. The system of claim 1, further including solar cells connected to and powering said pump means.

9. A process for producing electrical energy from high pressure, multicomponent hydrocarbon effluent of an offshore well which comprises the steps of:

separating liquid from gaseous components of said effluent;

work expanding said gaseous components to thereby produce electricity and substantially cooling said gaseous component;

introducing said gaseous components into a heat exchanger;

flowing warm surface layer water to said heat exchanger;

thermally expanding said gaseous components, and, passing the thus expanded gaseous components through electricity generating means to produce electrical current.

10. The process of claim 9, further including the step of flowing warm waste effluent to said surface water to increase the temperature thereof.

* * * * *